UNITED STATES PATENT OFFICE 2,495,268

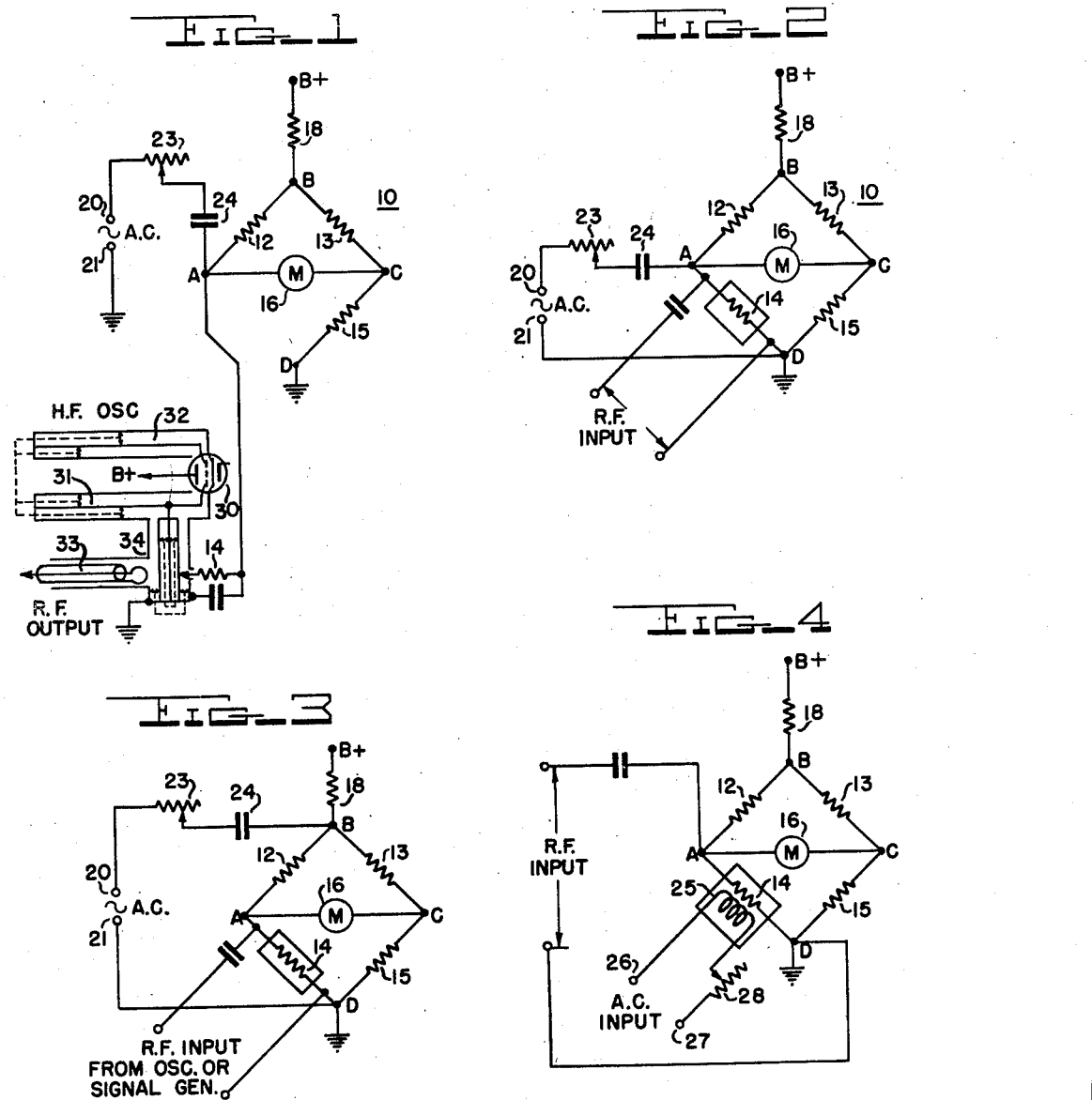

AMBIENT TEMPERATURE COMPENSATED BOLOMETER BRIDGE

John P. Leiphart, United States Navy

Application May 7, 1945, Serial No. 592,432

3 Claims. (Cl. 171—95)

(Granted under the act of March 3, 1883, as amended April 30, 1928; 370 O. G. 757)

This invention relates to the utilization of radio frequency oscillations and is directed particularly to monitoring and controlling devices useful in R. F. power measurement of high frequency oscillators and signal generators and for the purpose of maintaining a constant R-F (radio frequency) output therefrom.

One object of the present invention is to provide a simple and improved circuit arrangement for monitoring the radio frequency output of high frequency oscillators and signal generators.

A feature of the invention resides in the method of temperature compensation in a bridge circuit of the type utilizing a thermally-variable resistor in one of the arms of the bridge during use in making R-F (radio frequency) power measurements.

Other objects, features and advantages of the invention will become apparent from the following detailed specification, taken in connection with the accompanying drawing, wherein the invention is embodied in several practical forms in which:

Fig. 1 shows a diagrammatic representation of an oscillator embodying one form of monitoring device of the invention;

Fig. 2 is a schematic circuit diagram of the monitor circuit of the Fig. 1 arrangement; and Figs. 3 and 4 show two alternative forms of bridge type monitor circuits of this invention.

Referring to Figs. 1 and 2, 10 generally designates an elementary diagram of the four branch impedance bridge network embodying the present invention, the four corner terminals of the bridge circuit being designated A, B, C and D, respectively. Two adjacent arms at terminal B comprise two ohmic resistors 12 and 13 which are preferably identical and/or of equal resistive values. The third arm comprises a thermally-variable resistance device 14 such as a bolometer element or a thermistor, and the fourth arm contains an ohmic resistive impedance 15 which may be either fixed or adjustable at fixed resistive value. Terminals A and C are normally equipotential points across which is connected a sensitive indicating instrument 16, such as a galvanometer or a D.-C. milli-ammeter. The network is supplied at points B and D with an E. M. F. from a source of D.-C. potential, supplied to the bridge at terminal B through resistor 18 while the diametrically opposite terminal D of the bridge circuit is connected to ground. Since resistor 15 is at fixed resistive value the resistance of arm A—D will be fixed and the D.-C. potential from B—D will remain constant.

The thermally variable device 14 operates as follows if a bolometer element or a thermistor is employed: A fine wire usually situated within a glass vessel changes its resistance with temperature. Thus, if current is passed through a bolometer wire, the change in its resistance is a measure of the intensity of the current. As previously mentioned, terminals A and C are at the same potential but heating of the thermistor 14 by the R-F currents will heat up this arm of the bridge slightly increasing its resistive value and throwing the bridge out of balance. This degree of unbalance is the indication of the amount of R-F power dissipated in the element 14. Then, however, ambient temperature can cause an initial unbalance of the bridge. This effect is compensated for by more or less A.-C. power from the A.-C. source.

To compensate for temperature changes the main feature of the present invention comprises applying an alternating E. M. F. to the thermistor input. Thus, the thermistor 14 is heated by an A. C. voltage supplied to the terminals 20 and 21 and applied across the terminals A and D from an alternating current generator (not shown) through variable resistor 23 and capacitor 24 connected in series.

The resistor 14 is heated by the alternating current whose frequency is sufficiently high so that there is practically no fluctuation in wire temperature during the A.-C. cycle. With no R-F the terminals A and C are at the same potential, but the R-F power absorbed by the resistor 14 will heat this arm slightly, increasing its resistance. If the meter 16 is brought to zero reading when the R-F power is zero and with only A. C. and D. C. voltage applied to the bridge 10, the meter will read zero for zero power. When R-F is applied to the bridge along with A. C. and D. C. the meter pointer will move across the scale as the R-F power increases due to changes in the resistive value of the bolometer wire or thermistor 14 when the latter becomes heated. The R-F power may be regulated either by adjusting the plate voltage of the oscillator or by altering the coupling to the oscillator so as to bring the meter pointer to substantially mid-position. A direct reading of power is thus obtained.

Fig. 3 shows a bridge circuit similar to that of Figs. 1 and 2 but differs therefrom in that the applied alternating E. M. F. from the A. C. source is applied to terminals B and D. An advantage of the Fig. 3 arrangement is that A.-C. potential between terminals A—C will be small or zero.

A further alternative form of the invention is shown in Fig. 4 in which the balance of the bridge is secured by heating the arm of the bridge circuit containing the thermally variable resistor 14 by means of the heating coil 25 in series with the source of the alternating potential supplied to terminals 26 and 27 through variable resistor 28. If desired, a thermostat may be incorporated in the container housing the heating coil 25 to control the temperature surrounding the element 14.

From the above it should be apparent that the A. C. insertion voltage supplied to the bridges of the various embodiments disclosed serves to keep the thermistor or bolometer element 14 of the bridge circuit at a substantially constant operating level no matter what the ambient temperature, and thus a fixed deflection on the meter 16 will indicate the same amount of R-F power being dissipated in the element 14.

The bridge circuit of Fig. 1 is shown as being associated with an oscillation generator circuit of the resonator cavity type disclosed and claimed in the copending application of A. V. Haeff, T. E. Hanley and C. B. Smith, Serial No. 590,854, filed April 28, 1945, for Ultra-high-frequency signal generator comprising a high frequency oscillator tube 30 (type 446 triode) in a grounded-grid circuit consisting of two resonant cavities 31 and 32—one in grid-plate and the other in the grid-cathode circuit—formed by a pair of concentric tubular members placed one inside the other. A mutual inductance attenuator 33 is coupled through a short stub-line 34 to the outer (cathode) cavity of the oscillator. The output monitor is the bolometer element 14 connected to and forming one arm of the bridge 10.

While there has been described several embodiments of the invention, it will be obvious to those skilled in the art that various changes and modifications may be made therein without departing from the spirit of the invention.

The invention described herein may be manufactured and used by or for the Government of the United States of America for governmental purposes without the payment of any royalties thereon or therefor.

What is claim is:

1. In combination, a four-terminal bridge circuit having resistive impedances in each arm, one of said impedances being of the type such that the resistive value thereof varies substantially with thermal changes therein in proportion to the current flow therethrough, the remaining impedances being fixed values, a direct current milliammeter connected across one pair of diagonally opposite corners of said bridge, a source of unidirectional electromotive force connected across the other pair of diagonally opposite corners of said bridge, means including a substantially constant source of alternating electromotive force of audio frequency introduced to said bridge circuit for maintaining said thermally-variable resistive impedance substantially insensitive to ambient temperatures, said alternating electromotive force being initially adjusted to effect a balanced condition in the bridge circuit, and an input circuit to said bridge for introducing across said thermally-variable impedance a radio frequency oscillatory energy to be measured.

2. A system in accordance with claim 1, including means forming part of said insertion circuit of alternating electromotive force for controlling the output electromotive force thereof to said bridge, said means comprising an adjustable resistive impedance element.

3. In combination, a four-terminal bridge circuit having resistive impedances in each arm, one of said impedances being of the type such that the resistive value thereof varies substantially with the thermal changes therein in proportion to the current flow therethrough, the remaining impedances being selectively fixed, a direct current milliammeter connected across one pair of diagonally opposite corners of said bridge, a source of unidirectional potential connected across the other pair of diagonally opposite corners of said bridge, a source of alternating potential operatively connected to said thermally-variable resistive impedance for maintaining the same substantially insensitive to ambient temperature conditions, said alternating potential being initially adjusted to effect a balanced condition in the bridge circuit, and an input circuit to said bridge for introducing across said thermally-variable impedance a radio frequency oscillatory energy to be measured.

JOHN P. LEIPHART.

REFERENCES CITED

The following references are of record in the file of this patent:

UNITED STATES PATENTS

| Number | Name | Date |
|---|---|---|
| 1,590,420 | Chubb | June 29, 1926 |
| 1,901,741 | Fetsch | Mar. 14, 1933 |
| 2,204,179 | George | June 11, 1940 |
| 2,302,369 | George | Nov. 17, 1942 |
| 2,337,612 | Linder | Dec. 28, 1943 |
| 2,407,075 | Gurewitsch | Sept. 3, 1946 |
| 2,437,449 | Ames et al. | Mar. 9, 1948 |